(12) United States Patent
Robbins et al.

(10) Patent No.: US 6,457,089 B1
(45) Date of Patent: Sep. 24, 2002

(54) MICROPROCESSOR BUS STRUCTURE

(75) Inventors: Gordon J. Robbins; Donald Norman Senzig, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,368

(22) Filed: Oct. 21, 1999

(51) Int. Cl.⁷ .............................................. G06F 13/00
(52) U.S. Cl. ...................................................... 710/306
(58) Field of Search ........................ 710/100, 52, 107, 710/306

(56) References Cited

U.S. PATENT DOCUMENTS 4,261,034 A * 4/1981 Saccomano et al. .......... 710/49
6,034,545 A * 3/2000 Flynn .......................... 326/39

* cited by examiner

*Primary Examiner*—Glenn A. Auve
(74) *Attorney, Agent, or Firm*—Richard F. Frankeny; Winstead Sechrest & Minick P.C.; Volel Emile

(57) ABSTRACT

The present invention discloses a microprocessor bus structure that enables a processor chip to be designed with optional unidirectional or bi-directional I/O buses. The processor is designed with separate input and output bus internal to the chip. A gating network is coupled to these processor uni-directional busses that allows the chip to have an alternate externally wired bus structure. For the lowest cost and lowest performance only one set of bidirectional bus lines are wired external to the chip. These lines have a parallel driver and receiver with appropriate gating to allow the bus to be either in the send or receive mode. The signals from the processor uni-directional input and output buses are wired via appropriate gating to create a single bi-directional bus. For high performance operation where higher cost for higher bandwidth is justified, the bidirectional bus is gated to be a device output only bus and the alternate device input bus is gated to the processor input bus creating a true uni-directional bus structure. The bus enable line is wired to the appropriated stated depending on the wired microprocessor bus structure.

12 Claims, 4 Drawing Sheets

MICROPROCESSOR BUS STRUCTURE

TECHNICAL FIELD

The present invention relates in general to data processing systems, and in particular, to input/output (I/O) communication between a microprocessor and external system elements.

BACKGROUND INFORMATION

Microprocessors chips (integrated circuits) have been increasing in complexity wherein more of a computer system's function has been integrated onto the microprocessor chip. However, the performance of a chip is dependent on the flow of information, instructions and data. As processor speeds have increased there is a corresponding need to provide data and instructions to the processor faster. Memory is one of the system elements that has increasing demands for bandwidth in communicating with a microprocessor chip. Increasing memory access speed has always incurred increased cost. For years memory has been partitioned into performance elements. Cache memory is high speed memory that is loaded with information most accessed by the microprocessor. Cache memory is the fastest and is usually placed on the microprocessor chip in high performance systems. Cache memory is usually static RAM with the highest speed access, the most power, highest cost and most area per bit of all the memory on a chip. Because memory bandwidth and thus cache size increase with processor speed, some high speed memory has to be placed off the microprocessor chip. Including all required high speed memory on a chip would cause the chip size to increase, thus decreasing the yield and increasing the cost above acceptable limits for a given design.

Some microprocessor designs use bi-directional buses on the input and output (I/O) lines as a way to reduce the number of I/O drivers and pins for a given design. Since bi-directional buses usually cannot read and write simultaneously, system speed can be reduced in many applications requiring high I/O bandwidth. One solution to this problem has been to increase the number of I/Os and make a separate uni-directional bus for input and output lines, thus doubling the bandwidth. Uni-directional I/O buses increase chip cost by increasing the number of I/Os that have to exit the microprocessor chip and attach to second level packaging. More I/Os can also increase the cost of the system boards as well as the wiring complexity of a system using the microprocessor chip.

If a system needs performance it is usually appropriate to pay the increased cost to realize the increased performance. However, many times it is desirable to use a given chip architecture and design for several system level products. In these cases one does not want to pay for performance if it cannot be recovered in increased system sales or revenue. It would, however, be advantageous to use the total system volume to reduce overall manufacturing cost by achieving the economy of scale that comes with producing more units of a particular microprocessor chip design.

The present invention offers a solution to this problem by an alternate design of the I/O structure of the microprocessor chip.

SUMMARY OF THE INVENTION

The present invention discloses a microprocessor bus structure that can be optionally configured for high performance uni-directional buses or a lower performance bi-directional bus. A microprocessor chip is designed with internal processor uni-directional I/O buses. These buses are coupled to a selectively controlled device bi-directional I/O bus and an optionally wired device uni-directional input bus. In one mode of operation, the device uni-directional input bus is wired externally via first level packaging. A binary uni-directional enable line is also wired, at this time, that controls logic that disables the receivers of the device bi-directional I/O bus and enables coupling the receivers of the device uni-directional input bus to the processor uni-directional input bus. A binary bi-directional mode control line is also wired to enable the drivers in the device bi-directional bus. The microprocessor chip now has separate uni-directional buses for input and output wired from the processor to external devices via first level package wiring and printed circuit board interconnects. In another mode of operation, the device uni-directional input bus is not wired external to the chip and the binary uni-directional enable line is not selected and the uni-directional receivers are gated off. The device bi-directional I/O bus is coupled to the processor uni-directional I/O buses. The binary bi-directional mode control line remains under control of the processor which may selectively enable the drivers or the receivers of the device bi-directional I/O bus.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
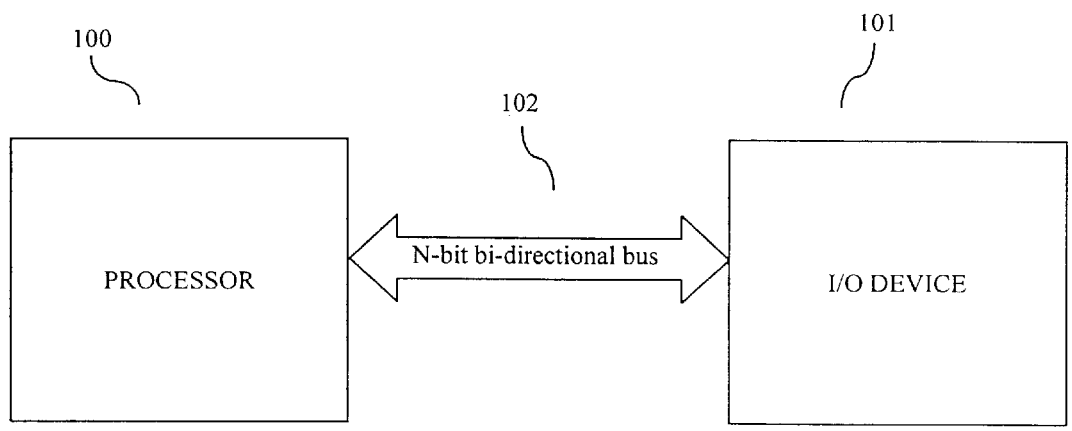
FIG. 1 illustrates a data processing system where a processor is coupled to an I/O device via a N-bit bi-directional I/O bus.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a data processing system consisting of a processor 100 and a I/O device 101 coupled via I/O bus 102. The I/O bus 102 is shown to be N-bits wide. N in this case represents an arbitrary number of bits for the bus. Bus 102 is designated as a bi-directional bus since data from the processor 100 to the I/O device 101 or from the I/O device 101 to the processor 100 is transmitted over the same wire or coupling media. Since most bi-directional buses are not simultaneously bi-directional, a device, like the processor 100, would have to send a request to a bus master (not shown) that would gate the processor 100 to send information and also gate the I/O device 101 to receive information. If the I/O device 101 has data to be sent to the processor 100 at the same time the processor 100 has data to be sent to the I/O device 101 it would normally wait for its request to be granted by the bus master. Because of contention for the bus 102, the speed of the bus 102 in the illustration of FIG. 1 is slowed. In the worst case, with equal send and receive requests including overhead for contention, the bus would be slowed to less than one-half its send or receive bandwidth.

Figure 2:
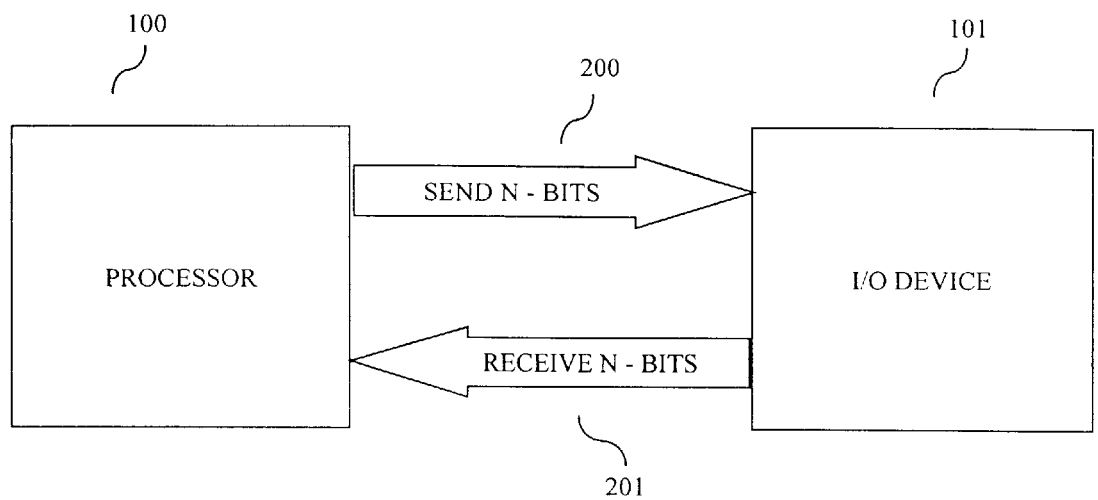
FIG. 2 illustrates a data processing system where a processor is coupled to an I/O device via a N-bit uni-directional I/O buses.

FIG. 2 illustrates the same system elements coupled with two uni-directional buses 200 and 201; bus 200 for sending data and bus 201 for receiving data. The buses 200 and 201 eliminate the bus contention and allow either device (in this example, processor 100 or I/O device 101) to send and receive information simultaneously. The number of wires or connections needed for the system in FIG. 2 is twice that of the system illustrated in FIG. 1.

An exemplary system configuration where there is a problem of bus speed and bus contention is the communication between a processor and external memory. The faster the processing speed, the faster a processor needs instructions to execute and the faster it needs to send and store the data or the results generated in a processing function. However, since the amount of memory necessary to support a given system architecture grows as the processor instruction execution speed, it is not always possible to put enough high speed (cache) memory on a chip to entirely eliminate the need for high speed communication to external memory remote from the processor chip.

The performance of I/O lines that exit a chip to coupled external devices is degraded by capacitance, inductance and the length of the I/O lines as the speed of communication on these lines is increased. Also the number of I/O lines exiting a chip increases the cost of the first level package, a structure that houses the chip and the conductors coupling external to the chip. The first level package or integrated circuit package contains the conductors that are used to couple to the next level wiring structure either a module or a printed circuit board or card. It is also possible to have a "chip on board" or "chip on module" circuit package where the integrated circuit is wired directly to a wiring structure that couples it to other chips or components.

In either a chip on board or chip on module, the number of integrated circuit or chip I/Os also increases the complexity of the circuit board on which the integrated circuit or processor chip is wired to other system devices. It is not unusual for modem processors to have very wide I/O communication buses to facilitate high performance operation. These wide I/O buses further complicate the problem of I/Os and wiring if a uni-directional bus is used.

Figure 3:
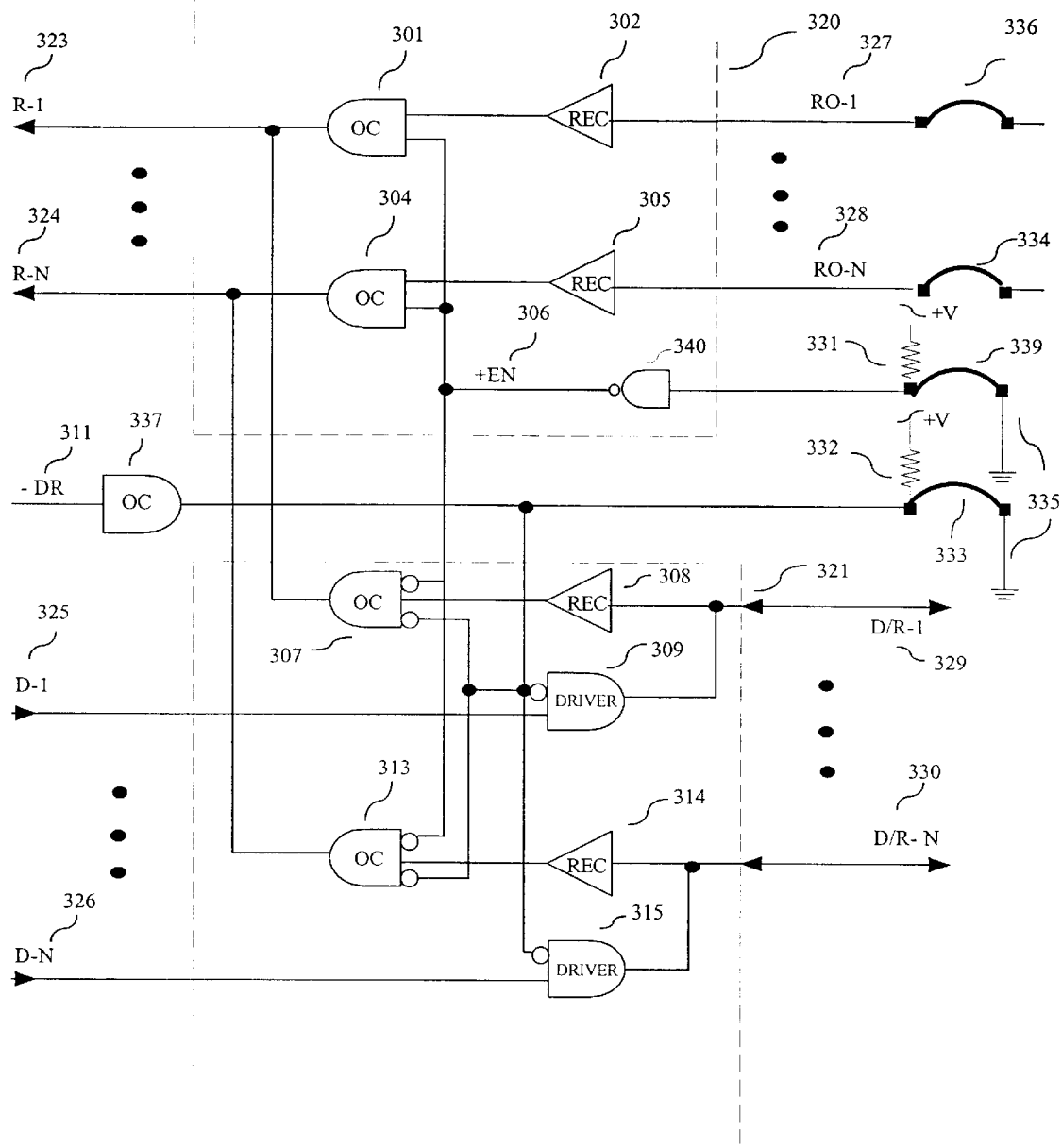
FIG. 3 is a circuit implementation of one embodiment of the present invention illustrating gating to select either a uni-directional bus structure or a bi-directional bus structure.

FIG. 3 illustrates another embodiment of the present invention. Dotted lines 320 illustrate a circuit for a N-bit bus of uni-directional lines exemplified by RO-1 327 through RO-N 328. Receivers (REC) 302 and 305 are just two receivers of a N-bit wide device I/O bus. Input signals RO-1 327 and RO-N 328 are coupled to receivers 302 and 305. In this embodiment of the present invention the output of receivers 302 and 305 are coupled to open collector (OC) AND gates 301 and 304. The output of AND gates 301 and 304, depicted as open collector devices, facilitate the wired ORing of these outputs with open collector gates 307 and 313. The output of gates 301 and 304 or gates 307 and 313 become inputs to a processor, such as processor 100.

Dotted lines 321 encloses two drivers and receivers of a N-bit wide device bi-directional I/O bus. Output lines from a processor (not shown) depicted by D-1 325 through D-N 326 are coupled to drivers 309 and 315 respectively. Drivers 309 and 315 are gated by a driver enable line –DR 311. When driver enable –DR 311 is low, drivers 309 and 315 are enabled and gates 307 and 313 are disabled. Under this condition, bi-directional bus depicted by lines D/R-1 329 through D/R-N 330 is in the drive mode. When driver enable –DR 311 is high, drivers 309 and 315 are disabled and gates 307 and 313 are enabled provided +EN 306 is also low. If +EN 306 is high, gates 307 and 313 are disabled and gates 301 and 304 are enabled allowing uni-directional bus operation on two separate buses.

The circuitry in FIG. 3 is just an illustration of one of many possible implementations of a bus structure that is uni-directional at a processor and either uni-directional or bi-directional at the wired device output structure. In this embodiment of the present invention, processor input bus lines R-1 323 through R-N 324 are examples of two lines of a N-bit wide processor input bus. Likewise processor output bus lines D-1 325 through D-N 326 are two lines of a N- bit wide processor output bus. These two uni-directional buses and +EN 306 are designed into the basic microprocessor chip structure. A bus gating network exemplary of the one illustrated by gates 301, 304, 307, and 313 would be implemented to allow the selection of either a bi-directional or a uni-directional device bus structure.

For those applications where device I/O performance is important both the bi-directional bus lines exemplified by D/R-1 329 through D/R-N 330 and the uni-directional bus lines exemplified by RO-1 327 through RO-N 328 would be wired external to the chip via the first level chip packaging using wiring exemplified by the two dotted lines 334 and 336. Correspondingly I/O devices that support uni-directional communication could then be wired to the microprocessor chip via a printed circuit card.

The +EN 306 gating line would be set to an appropriate level by wired connection, illustrated by dotted line 339, and gate 340 to enable the uni-directional communication internal to the processor chip. A high level for +EN 306 would also disable gates 307 and 313 removing receivers 308 and 314 from the processor uni-directional input bus.

For those applications where the microprocessor chip would be useable, but the system does not need the I/O speed, only the bi-directional lines like DR-1 329 would be wired external to the chip via the first level chip packaging. The +EN 306 gating line may be driven to the appropriate level by pull-up resistor 331 when wire connection 339 is not connected to ground via first level packaging to disable the exemplary receivers 302 and 305 via gates 301 and 304. Additionally, connections exemplified by lines 330 and 336 may then be omitted. The bi-directional bus structure would be enabled for a lower cost chip package and simpler printed circuit board wiring.

Figure 4:
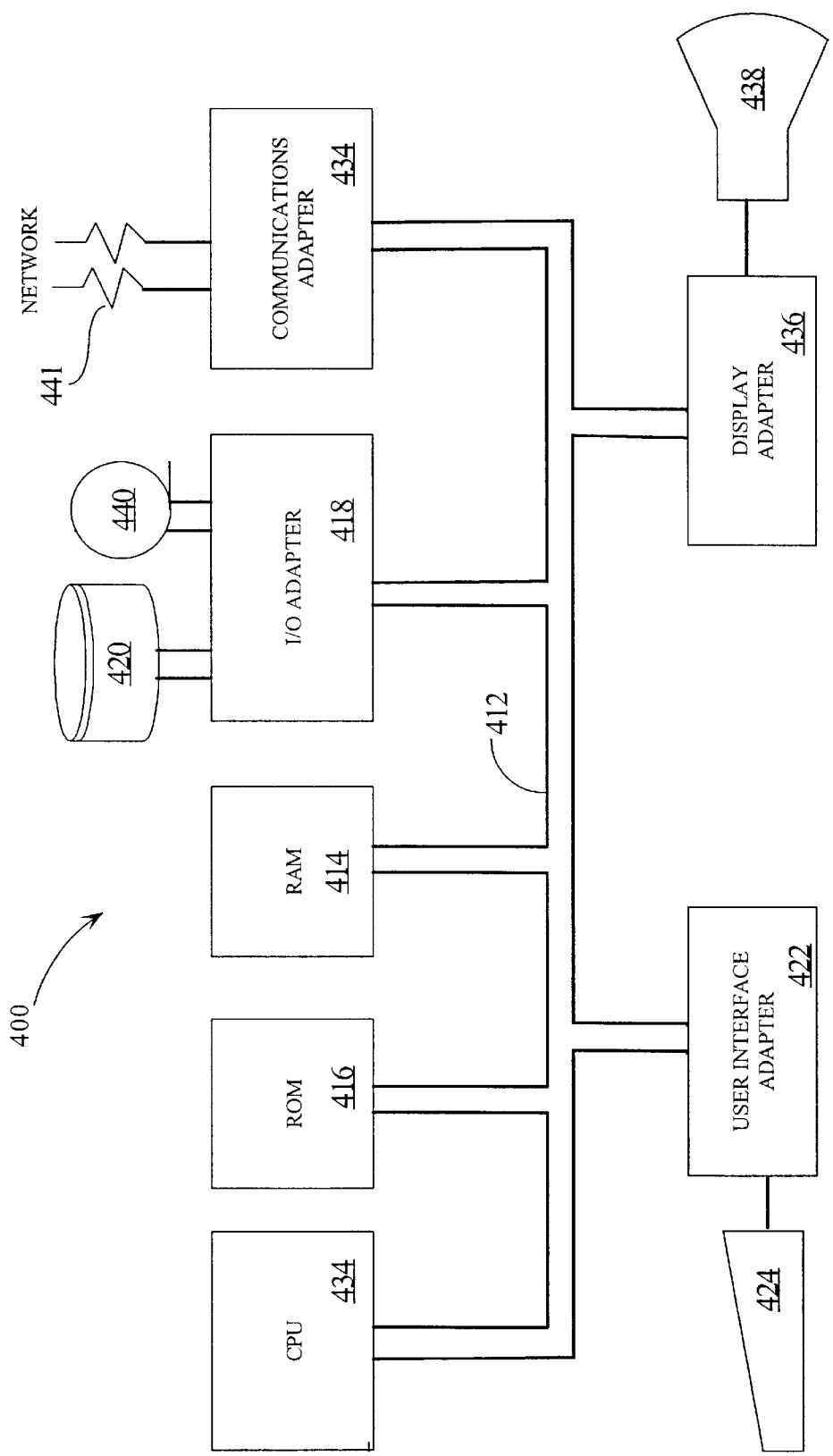
FIG. 4 illustrates a data processing system configured in accordance with the present invention.

A representative hardware environment for practicing the present invention is depicted in FIG. 4, which illustrates a typical hardware configuration of data processing system 413 in accordance with the subject invention having central processing unit (CPU) 410, such as the microprocessor chip design of the present invention, and a number of other units interconnected via system bus 412. Data processing system 413 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, and/or other user interface devices such as a touch screen device (not shown) to bus 412, communication adapter 434 for connecting data processing system 413 to a data processing network, and display adapter 436 for connecting bus 412 to display device 438. CPU 410 may include other circuitry not shown herein, which will include circuitry commonly found within a microprocessor, e.g., execution unit, bus interface unit, arithmetic logic unit, etc. CPU 410 may also reside on a single integrated circuit. Various system solutions would be possible using a microprocessor chip with the bus structure of the present invention.

Although the present invention and its advantages have been described in detail, it should be understood that various changes, substitutions and alterations can be made herein without departing from the spirit and scope of the invention as defined by the appended claims.

What is claimed is:

1. A processor bus structure comprising:
   a processor uni-directional input bus;
   a processor uni-directional output bus;
   a uni-directional device input bus coupled to said processor uni-directional input bus via a first set of receivers and a first gating network, wherein said uni-directional device input bus is selectively coupled to a first level chip package via first conductors;
   a device bi-directional I/O bus coupled to said processor uni-directional output bus and said processor uni-directional input bus via a second set of receivers, a first set of drivers and a second gating network, wherein said device bi-directional I/O bus is coupled to said first level chip package via second conductors;
   a mode select line operable to (1) enable said first set of drivers and disable said second set of receivers when in a first state and (2) disable said first set of drivers and enable said second set of receivers when in a second state; and
   a bus gating signal operable to (1) enable said first set of receivers and to disable said second set of receivers when in a first state, and (2) disable said first set of receivers and enable said second set of receivers when in a second state.

2. The processor bus structure of claim 1, wherein said first gating network (1) selectively couples a line of said first set of receivers and de-couples a corresponding line of said second set of receivers to a corresponding line of said processor uni-directional input bus when said bus gating signal is in said first state and (2) selectively de-couples a line of said first set of receivers and couples a line of said second set of receivers to a corresponding line of said processor uni-directional input bus when said bus gating signal is in said second state.

3. The processor bus structure of claim 1, wherein said second gating network selectively has said mode select signal set to said first state when said device uni-directional input bus is coupled to said first level chip package via said first conductors and said bus gating signal is controllable from said processor to be either in said first or said second state when said device uni-directional input bus is not coupled to said first level chip package via said first conductors.

4. The processor bus structure of claim 1, wherein said bus gating signal is set to said first state when said device uni-directional input bus is coupled to said first level chip package via said first conductors and said bus gating signal is set to said second state when said device uni-directional input bus is not coupled to said first level chip package via said first conductors.

5. A data processing system, comprising:
   a central processing unit (CPU);
   random access memory (RAM);
   read only memory (ROM);
   an I/O adapter; and
   a bus system coupling said CPU to said ROM, said RAM and said I/O adapter, wherein said CPU further comprises:
   a processor bus structure, said processor bus structure further comprising:
      a processor uni-directional input bus;
      a processor uni-directional output bus;
      a device uni-directional input bus coupled to said processor uni-directional input bus via a first set of receivers and a first gating network, wherein said uni-directional device input bus is selectively coupled to a first level chip package via first conductors;
      a device bi-directional I/O bus coupled to said processor uni-directional output bus and said processor uni-directional input bus via a second set of receivers, a first set of drivers and a second gating network, wherein said device bi-directional I/O bus is coupled to said first level chip package via second conductors;
      a mode select line operable to (1) enable said first set of drivers and disable said second set of receivers when in said first state and (2) disable said first set of drivers and enable said second set of receivers when in said second state; and
      a bus gating signal operable to (1) enable said first set of receivers and to disable said second set of receivers when in said first state, and (2) to disable said first set of receivers and to enable said second set of receivers when in said second state.

6. The system of claim 5, wherein said first gating network selectively couples a line of said first set of receivers and de-couples a corresponding line of said second set of receivers to a corresponding line of said processor uni-directional input bus when said bus gating signal is in said first state and selectively de-couples a line of said first set of receivers and couples a line of said second set of receivers to a corresponding line of said processor uni-directional input bus when said bus gating signal is in said second state.

7. The system of claim 5, wherein said second gating network selectively has said mode select signal set to said first state when said device uni-directional input bus is coupled to said first level chip package via said first conductors and said bus gating signal is controllable from said processor to be either in said first or said second state when said device uni-directional input bus is not coupled to said first level chip package via said first conductors.

8. The system of claim 5, wherein said bus gating signal is set to said first state when said device uni-directional input bus is coupled to said first level chip package via said first conductors and said bus gating signal is set to said second state when said device uni-directional input bus is not coupled to said first level chip package via said first conductors.

9. A bus structure comprising:

a first uni-directional input bus;

a first bi-directional I/O bus; and a circuit operable for enabling and disabling said first uni-directional input bus and selecting said first bi-directional I/O bus to be either an input bus or an output bus, wherein said circuit includes a circuit package for coupling said first uni-directional input bus and said first bi-directional I/O bus to a second bus structure and said circuit package operable to enable said first uni-directional input bus.

10. The bus structure of claim 9, wherein said second bus structure comprises either both a second uni-directional input bus and a second bi-directional I/O bus or only said second bi-directional I/O bus.

11. The bus structure of claim 10, wherein said circuit disables said first uni-directional input bus if only said first bi-directional I/O bus is coupled to said second bi-directional I/O bus and further said circuit operable to select said first bi-directional I/O bus to be either an input or an output bus.

12. The bus structure of claim 11, wherein said second bus structure further comprises control lines operable to (i) enable said first uni-directional input bus and (ii) select said first bi-directional bus to be an output bus if said first uni-directional input bus is coupled to said second uni-directional input bus and said first bi-directional I/O bus coupled to said second bi-directional I/O bus.

* * * * *